J. C. BAKER.
Seed-Drills.
No. 154,780. Patented Sept. 8, 1874.
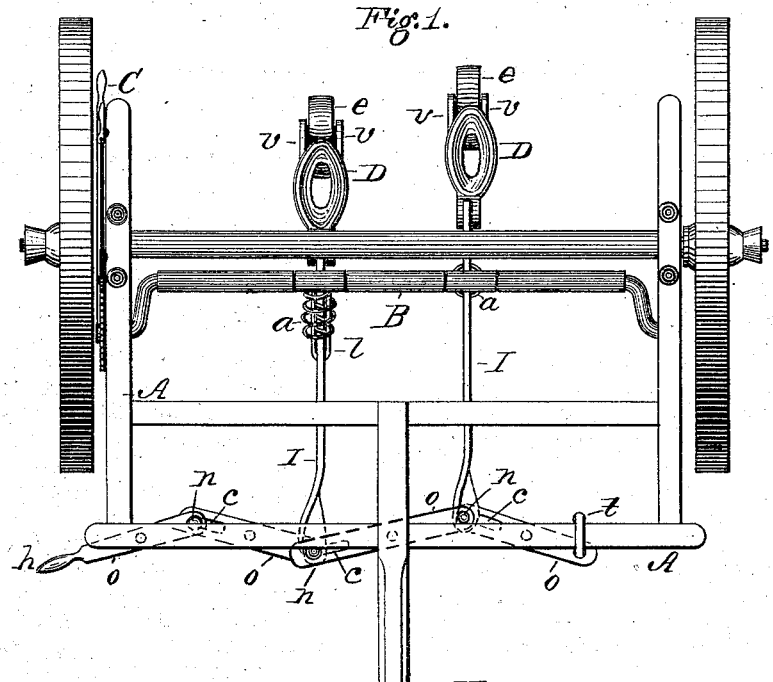
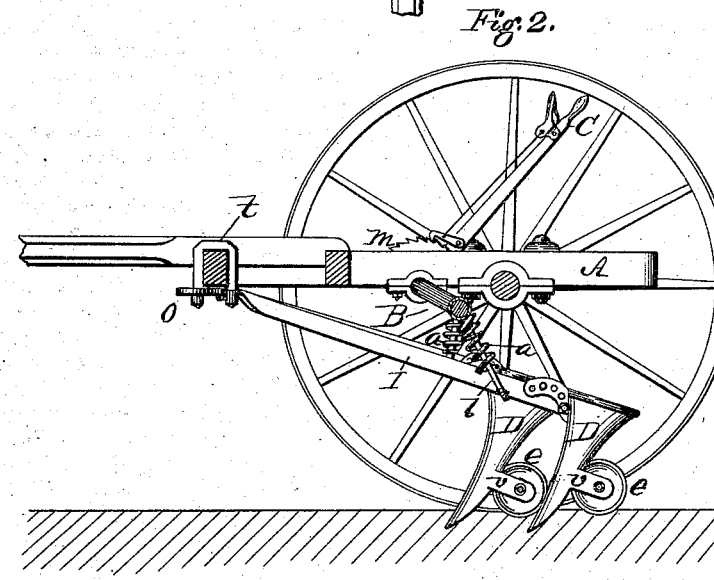
Witnesses:
H. H. Dodge
W. E. Chiffin
Inventor:
John C. Baker,
by Dodge & Son
attys

UNITED STATES PATENT OFFICE.

JOHN C. BAKER, OF MECHANICSBURG, OHIO.

IMPROVEMENT IN SEED-DRILLS.

Specification forming part of Letters Patent No. 154,780, dated September 8, 1874; application filed July 13, 1874.

*To all whom it may concern:*

Be it known that I, JOHN C. BAKER, of Mechanicsburg, in the county of Champaign and State of Ohio, have invented certain Improvements in Seed-Drills, of which the following is a specification:

My invention relates to grain-drills; and the invention consists in a series of springs, arranged upon the arms of a rock-shaft, to press the hoes into the ground, and a roller attached to the rear of each hoe to regulate its depth and cover the grain. It further consists in a series of pivoted bars, arranged at the front of the frame, and to which the drag-bars are attached, for adjusting the hoes in double or single rank, all as hereinafter more fully described.

Figure 1 is a top-plan view, and Fig. 2 is a side elevation, of my improved apparatus.

In constructing my improved drill I provide a frame, A, of the usual style. The drag-bars I, instead of being attached directly to the frame, are connected at their front ends to a series of flat bars, $o$, each of which is pivoted at its center to the under side of the front part of the frame A, these bars $o$ being connected at their ends by slats $c$ and studs or bolts $n$, so that when one is moved it will move all the rest of the series, as shown in Fig. 1, the outer bar of the series on one or both sides of the frame being provided with a handle, $h$, for moving them. The drag-bars, as shown in Fig. 1, are attached to these pivoted bars $o$ at their ends, so that when the bars are moved the drag-bar attached at one end will be drawn forward, while the one at the opposite end will be shoved back, thereby arranging the hoes D in two ranks. By moving the bars $o$ so as to be in a straight line, all the hoes will be arranged in a single rank; and as the drag-bars are attached at opposite ends of the bars $o$, equidistant from their central pivot, they will balance each other, so that when once adjusted there will be no tendency to change their position. It will also be apparent that, with this arrangement, either set of drag-bars, with their hoes, may be advanced to the front, or thrown to the rear, at will; and this will enable them to be more readily cleared of the adhering weeds, or similar material, which accumulates upon or in front of the hoes.

A staple or clip, $t$, may be secured to the frame, or any similar means used for limiting the motion of the bars $o$, and, consequently, of the adjustment of the hoes; and, if desired, a pin or any similar device may be used for securing the bars $o$ in place when adjusted, and prevent the hoes from becoming disarranged.

Across the frame I arrange a crank-shaft, B, to which each of the drag-bars I is attached by a metallic loop or rod, $l$, as shown in Figs. 1 and 2, each loop $l$ being connected to sleeve or tube, fitting loosely on the shaft B, to permit them to adjust themselves freely to the varying positions of the drag-bars and hoes, and around which is placed a spiral spring, $a$, one end bearing upon the drag-bar, while the other end bears against the shaft B, thereby tending to press down upon the drag-bars, and thus force the hoes into the soil. A lever, C, is attached to the crank-shaft B, at one end, by which the drag-bars, with their hoes, can be raised or lowered at pleasure. To the lever C is connected a pawl that engages with the ratchet-teeth of a plate, $m$, as shown in Fig. 2, by which the shaft B can be secured at any desired height, the pawl being connected by a rod to a hand-piece pivoted to the lever C, as shown, so that it can be operated by the driver at any time. Each of the hoes D have projecting from their rear side two ears or arms, $v$, in which a roller or wheel, $e$, is mounted on each hoe, as shown in Fig. 2. These rollers are thus arranged to follow directly in the furrow made by the hoe, and in doing so they subserve two purposes: First, they serve as a means of gaging the depth to which the hoe enters the soil, which is especially important when springs are used to press the hoes into the soil, as in this case; and, second, they serve to cover the grain in the furrow, and also to press the mellow soil down lightly upon the grain.

It will thus be seen that the springs will serve to press the hoes into the soil, and that, by adjusting the shaft B, they can be pressed down with more or less force, according to the nature and condition of the soil; and, as the rollers e attached to the hoes will prevent them from entering too deeply when the soil is light or mellow, I thus insure the planting of the grain at a more uniform depth than has been practicable with drills as heretofore made.

These improvements may be used with any style of feeding devices which deliver the grain to the hoes for sowing in drills; and though I have shown but two drag-bars in the drawing, it will be understood that any desired number may be used, these serving to illustrate my improvements.

It will also be seen that, by locating the springs which press upon the drag-bars in front of the axle, they thereby exert a force upward on the front part of the frame, and on the tongue which is rigidly attached to the frame, thus relieving the horses' necks more or less from the downward pressure of the tongue thereon; and as this downward pressure increases just in proportion as the hoes are pressed into the soil, and meet with resistance therefrom, so in a like proportion do the springs tend to relieve the downward pressure of the tongue, as they press upon the frame and tongue with the same force that they press down on the drag-bars. By this means the drill is made to operate with much greater ease upon the animals; so, too, by pressing the loose soil down upon, and in close contact with, the grain, the latter is much more certain to germinate, and thus the benefit of all the seed sown is much more fully secured.

Having thus described my invention, what I claim is—

1. The combination of the rock-shaft B, springs a, and loops l with the drag-bars I, having the hoes D, with the wheels e attached thereto, all constructed and arranged to operate substantially as described.

2. The series of pivoted bars o, having the drag-bars attached thereto, for the purpose of adjusting the hoes in single or double rank, as set forth.

JOHN C. BAKER.

Witnesses:
 I. W. LEGGE,
 T. E. SHEPHERD.